(12) United States Patent
Ojanen et al.

(10) Patent No.: US 8,350,541 B2
(45) Date of Patent: Jan. 8, 2013

(54) CONTROL CIRCUIT AND METHOD FOR A SOFT-START SCHEME OF A SWITCH MODE POWER SUPPLY FOR A POWER AMPLIFIER

(75) Inventors: Martti Ojanen, Turku (FI); Janne Tiisanoja, Pertteli (FI)

(73) Assignee: Nokia Corporation, Espoo (FI)

( * ) Notice: Subject to any disclaimer, the term of this patent is extended or adjusted under 35 U.S.C. 154(b) by 930 days.

(21) Appl. No.: 12/010,997

(22) Filed: Jan. 31, 2008

(65) Prior Publication Data
US 2009/0143032 A1    Jun. 4, 2009

(30) Foreign Application Priority Data
Nov. 29, 2007    (FI) .................................. 20075854

(51) Int. Cl.
*G05F 1/40* (2006.01)
*G05F 1/00* (2006.01)

(52) U.S. Cl. ........................ 323/238; 323/266

(58) Field of Classification Search .......... 323/237–238, 323/266, 282, 901; 363/49, 74
See application file for complete search history.

(56) References Cited

U.S. PATENT DOCUMENTS

| | | | |
|---|---|---|---|
| 5,903,415 A | 5/1999 | Gill | |
| 6,350,960 B1* | 2/2002 | Norris | 219/121.54 |
| 6,469,914 B1 | 10/2002 | Hwang et al. | |
| 6,515,880 B1 | 2/2003 | Evans et al. | |
| 6,969,977 B1* | 11/2005 | Smith | 323/222 |
| 7,088,078 B2 | 8/2006 | Liu | |
| 7,106,036 B1 | 9/2006 | Collins | |
| 7,136,292 B1 | 11/2006 | Chan et al. | |
| 7,656,691 B2* | 2/2010 | Nielsen et al. | 363/79 |
| 7,675,279 B2* | 3/2010 | Okamoto et al. | 323/283 |
| 7,755,340 B2* | 7/2010 | Karasawa et al. | 323/282 |
| 2004/0141338 A1 | 7/2004 | D' Cunha et al. | |
| 2004/0201369 A1* | 10/2004 | Perrier et al. | 323/280 |
| 2005/0048932 A1* | 3/2005 | Balasubramaniyan et al. | 455/93 |
| 2005/0270804 A1* | 12/2005 | Liu | 363/16 |
| 2007/0064454 A1* | 3/2007 | Chen et al. | 363/49 |
| 2007/0132438 A1 | 6/2007 | Jang et al. | |
| 2007/0216615 A1* | 9/2007 | Itoh | 345/82 |

OTHER PUBLICATIONS

Deng, Haifei et al., "*Monolithically Integrated Boost Converter Based on 0.5-μm CMOS Process*", IEEE vol. 20, No. 3, May 2005, pp. 628-638.
TPS6734I, "*Fixed 12-V 120-mA Boost-Converter Supply*", Texas Instruments, revised Jan. 1999, pp. 1-20.
LT1946A, "*2.7 MHz Boost DC/DC Converter with 1.5A Switch and Soft-Start*", Linear Technology, pp. 1-12.
EL7581, "*3-channel DC/DC Converter*", Intersil, Mar. 9, 2006, pp. 1-17.
International Search Report, PCR/FI2008/050687 dated Mar. 26, 2009.

* cited by examiner

*Primary Examiner* — Adolf Berhane
*Assistant Examiner* — Jeffrey Gblende
(74) *Attorney, Agent, or Firm* — Squire Sanders (US) LLP (57) ABSTRACT

There is provided a control circuit including a sampling controller configured to sample an output voltage of a power converter at an appropriate time slot by opening a control loop. A soft-start circuit configured to enable soft-starting of an internal soft-start reference voltage to start from the sampled output voltage and to control the internal soft-start reference voltage to a predetermined target value in order to pre-charge the output voltage close to an input voltage level, or to continue charging the output voltage to a predetermined output voltage value.

28 Claims, 4 Drawing Sheets

CONTROL CIRCUIT AND METHOD FOR A SOFT-START SCHEME OF A SWITCH MODE POWER SUPPLY FOR A POWER AMPLIFIER

FIELD OF THE INVENTION

The present invention relates to a control circuit (of a switched mode power supply (SMPS) for a power amplifier), to a control method, to a multimode transmitter, and to a computer-readable program distribution medium.

BACKGROUND OF THE INVENTION

When the power of a switched mode power supply (SMPS) integrated circuit (IC) starts operating, the current required to charge a capacitor in the system may produce significant input current requirements. If the current used is too high, the battery voltage may drop, thus leading to the devices in the system entering a reset state or providing an erratic operation.

To overcome the problem above, a soft-start scheme may be used to limit the current at a start-up phase. The current capability of the IC is slowly raised until full current capability is reached. Such schemes are typically used in many of present-day boost converters, for example.

Typical boost applications are tuned for ms range of a start-up time. However, this is not possible e.g. in multi-mode cellular phone transmitters in which the wake-up time of an individual block before e.g. a transmission (TX) slot is limited; thus, a very fast rise time is mandatory. Therefore it is beneficial to use such an arrangement of power switches which allows an output voltage to be pre-charged whenever the battery voltage is available. However, this makes the wake-up phase different from a very basic application, when it is a question of boost converter topology arrangements.

Figure 1:
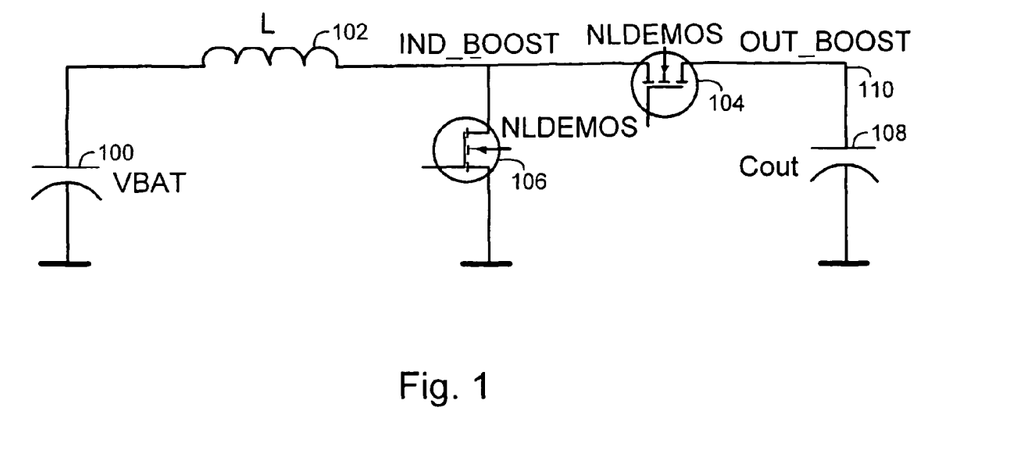
FIG. 1 is an example of an NLDEMOS power switch configuration in a boost converter.

When switches are arranged as in the example of FIG. 1, the initial output voltage is battery voltage minus 300 ... 400 mV due to a so-called body-diode of an NLDEMOS (N-type lateral double diffused with drain extension metal-oxide switch transistor). Thus, without this kind of arrangement, an in-rush current would be huge if minimum rise time of the boost converter was needed and an output voltage was started from 0V. However, after an initial phase when successive idle and active states follow, the output voltage is higher than VBAT 100 (input voltage) in the case of a boost power converter while working in different output voltage domains.

Arranging the power switches according to the example of FIG. 1, however, does not solve the problem. In such arrangements of power switches, the start time is still too long if the soft-start methodology is accomplished in a traditional way since when such a methodology is enabled, its internal soft-start reference voltage still starts from zero and proceeds up to the external reference voltage. Further, when a coefficient of voltage ramp is normally constant, the output voltage starts to increase just after the internal reference voltage is reaching the pre-charged output voltage. Another phenomenon is that even though the output voltage is pre-charged as configured in the example of FIG. 1, it may be discharged if the control circuitry tries to make the converter output voltage follow from 0V starting internal reference voltage. This further leads to an extra charging current needed to compensate for the energy lost under pre-charged voltage decreased.

For example, commercial chips EL7581 and LT1946A are used in this field. In EL7581, an external capacitor controls the start-up time constant. Another solution is related to a chip called TPS6734I which relies to the same as the above and to some further additions. The soft-start clamp circuit limits the signal level on error-amplifier output during start-up. The voltage on soft-start is amplified and used to momentarily override the error-amplifier output until it rises above that output, at which point the error-amplifier takes over.

In an article entitled: "Monolithically Integrated Boost Converter", IEEE TRANSACTIONS ON POWER ELECTRONICS, VOL. 20, NO. 3, MAY 2005, page 631, a special procedure during start-up is described where a large delay time is set at power up. After the delay, the output voltage is be one diode drop lower than the input voltage. The chip works in an open-loop mode until the output voltage is higher than 2.4 V. After that the soft-start is realized by slowly increasing the reference voltage. Then, during the soft start period, the output voltage is already 2.4 V for maintaining the output voltage. In the chip, the starting point of the reference voltage for the soft-start period is a fixed value of 0.8 V.

A patent publication U.S. Pat. No. 5,903,451 describes an AC-AC conversion application based on an input voltage that changes the PWM frequency of the soft start circuitry. The purpose is to provide a fast start-up time over a wide main input voltage range of 90 V up to 265 V. Another patent publication U.S. Pat. No. 6,515,880 describes a DC-DC converter having buck and boost parts included that combine load condition by its controller for producing a soft-start signal that limits the duty cycle of the power regulator switches at start-up. The duty cycle limit is gradually increased over time by operation of the signal. This solution is thus similar to the solution used in chip TPS6734I.

A patent publication U.S. Pat. No. 7,088,078 B2 describes having a soft-start circuitry reaching a predetermined value after which a soft-start period reaches its end point more rapidly. This equals having two parts to ramp up internal reference voltage slower and faster when the first output voltage has already been reached. A patent publication U.S. Pat. No. 7,106,036 describes a special power-down sequence with a combination of a delay timer and mode control that also control a soft-start circuit mode. A reset signal assertion sets a specific reference signal level. Further, a soft-start generating voltage ramp is enabled if its level is below a predetermined value. Here, focus is on modes of power-downs and the soft-start is a basic scenario.

Accordingly, improved solutions are needed where the drawbacks of the known solutions are overcome.

BRIEF DESCRIPTION OF THE INVENTION

An object of the present invention is to provide an improved method, a control circuit, a multimode transmitter, and a computer-readable program distribution medium. The objects of the invention are achieved by a method and arrangements, which are characterized by what is stated in the independent claims.

According to an aspect of the invention, there is provided a control circuit comprising: a sampling controller configured to sample an output voltage of a power converter at an appropriate time slot by opening a control loop; and a soft-start circuit configured to enable soft-starting of an internal soft-start reference voltage to start from the sampled output voltage and to control the internal soft-start reference voltage to a predetermined target value in order to pre-charge the output voltage close to an input voltage level, or to continue charging the output voltage to a predetermined output voltage value.

According to another aspect of the invention, there is provided a control method comprising: sampling an output voltage of a power converter at an appropriate time slot by opening a control loop; enabling soft-starting of an internal soft-start reference voltage to start from the sampled output voltage; and controlling the internal soft-start reference voltage to a predetermined target value in order to pre-charge the output voltage close to an input voltage level, or to continue charging the output voltage to a predetermined output voltage value.

According to another aspect of the invention, there is provided a multimode transmitter comprising a control circuit according to claim 1.

According to another aspect of the invention, there is provided a computer-readable program distribution medium encoding a computer program of instructions for executing a computer process. The process comprises: sampling an output voltage of a power converter at an appropriate time slot by opening a control loop; enabling soft-starting of an internal soft-start reference voltage to start from the sampled output voltage; and controlling the internal soft-start reference voltage to a predetermined target value in order to pre-charge the output voltage close to an input voltage level, or to continue charging the output voltage to a predetermined output voltage value.

According to another aspect of the invention, there is provided a control circuit comprising: means for sampling an output voltage of a power converter at an appropriate time slot by opening a control loop; and means for enabling soft-starting of an internal soft-start reference voltage to start from the sampled output voltage and means for controlling the internal soft-start reference voltage to a predetermined target value in order to pre-charge the output voltage close to an input voltage level, or to continue charging the output voltage to a predetermined output voltage value.

The invention provides several advantages. No external reference capacitors are required. The output voltage is naturally pre-charged close to the input voltage level, or the output voltage of a power converter is allowed to stay at higher or lower level, or even almost at the level it was in the former active state before entering idle or power-off state. No specific arrangements in the control loop block of a power converter are necessary. Fast transient response is enabled. Normal mode operating frequency may be used also during the soft-start phase.

BRIEF DESCRIPTION OF THE DRAWINGS

In the following the invention will be described in greater detail by means of exemplary embodiments with reference to the attached drawings, in which.

DETAILED DESCRIPTION OF THE INVENTION

FIG. 1 describes an example of a basic configuration of a useful arrangement of NLDEMOS switches 104, 106 for a boost converter application. The power switches used in this example may also be of other types than just n-type of switches, such as p-type ones or combination thereof. From the point of view of technology, they can be other MOS, bipolar, GaAs or any suitable electrical high current switches.

With the configuration of FIG. 1, at an initial phase, an OUT_BOOST (boost converter output voltage) voltage node is automatically pre-charged close to an input voltage (VBAT) 100 level, e.g. around VBAT minus 300 . . . 400 mV due to a forward biased body-diode of the series NLDEMOS (N-type lateral double diffused with drain extension metal-oxide switch transistor) 104, thus giving a good starting point from the point of view of powering up. However, after an initial phase while successive idle and active states follow, the output voltage is higher than VBAT 100 in the case of a boost power converter.

The configuration of FIG. 1 may be called an open-loop configuration since the controlling gates of the switches may be in a mode where the control of which is without any feedback information from the OUT_BOOST node 110. In a more advanced control method, this information is however used because good regulation properties can be achieved in a so-called closed-loop configuration. This kind of control circuit 200 is described in the example of FIG. 2.

Figure 2:
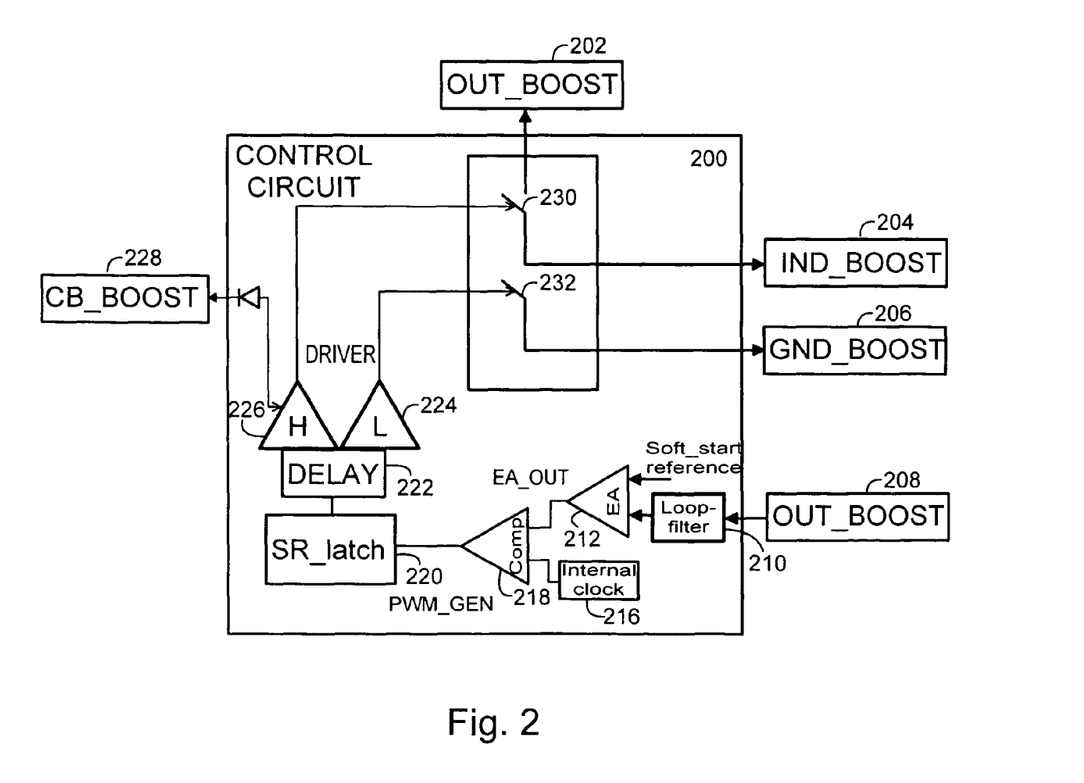
FIG. 2 is an example of a boost converter topology in a closed loop configuration.

In the example of FIG. 2, an OUT_BOOST 208 is directed via a loop-filter block 210 to an error amplifier (EA) 212 that controls the input voltage of a pulse-width modulator (PWM) circuitry (PWM GEN) 216, 218, 220, 222, which then instructs driver stages 224, 226 of the converter to turn on and off switches 230, 232 in such a way that high and low-side switches are not conducting simultaneously. The internal clock block 216 produces a saw-tooth reference waveform for a comparator block 218. SR_latch 220 is a flip-flop that is set or reset by an analog control word from the error amplifier 212. A delay block 222 adds delays to a digital control command in order to inhibit the power switches 230, 232 from conducting simultaneously. Eventually, the OUT_BOOST voltage node 202 has a voltage value that is controlled by a soft start reference block (312 in FIG. 3A). A CB_BOOST 228 is ac-coupled to IND_BOOST 204 by a capacitor, which is charged to the boost-strapped voltage for a floating high-side switch driver stage. The GND_BOOST 206 isolates noisy power switches' current loops. Note that the IND_BOOST coil L 102 and the OUT_BOOST with the capacitor Cout 108 of FIG. 1 are excluded in FIG. 2.

A start-up phase of a boost converter or any power converter regulator is very tricky because large energy capacitors are normally used at their outputs. Thus, a special soft-start method is needed to wake them up. However, traditional methods with large time constants are not possible e.g. in multi-mode cellular phone transmitter applications in which the wake-up time of individual blocks before e.g. a transmitter slot is limited and therefore a very fast wake-up time is mandatory. In an embodiment, a pre-charged output voltage is taken to use as in the example of FIG. 1.

Figure 3A:
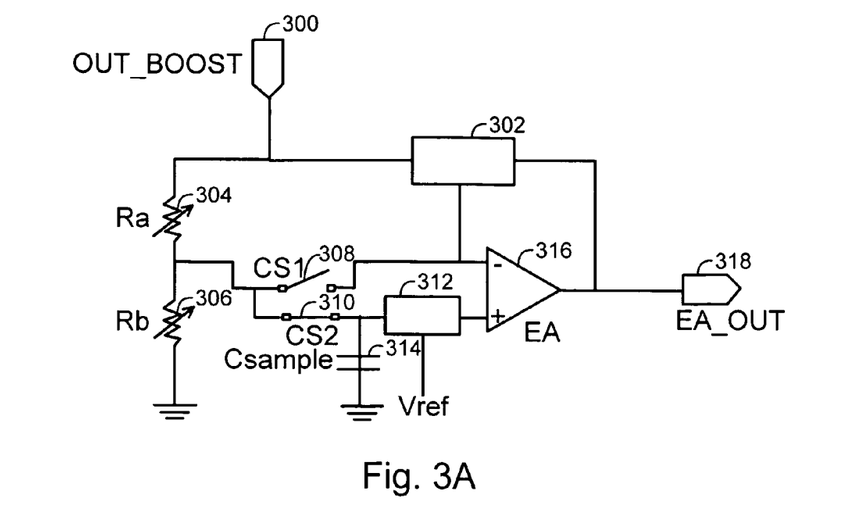
FIGS. 3A and 3B illustrate examples of a sampled soft-start starting point scenario.
Figure 3B:
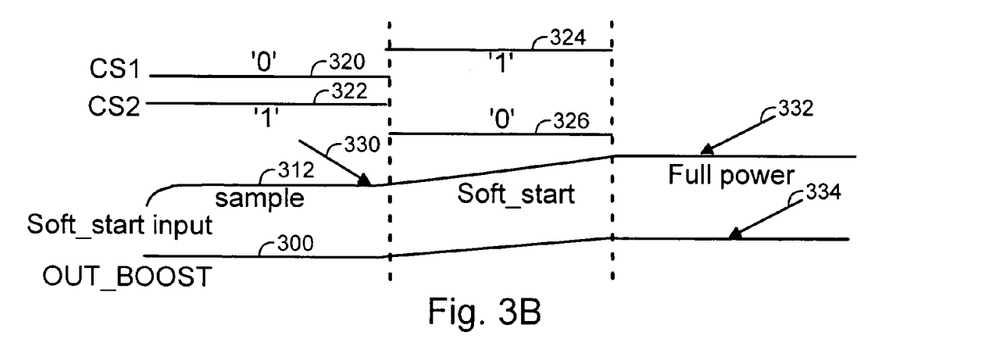

FIGS. 3A and 3B describe an example of the whole soft-start sequence according to an embodiment. Csample 314 routing is enabled via a CS2 switch 310 in order to sample OUT_BOOST 300 at an appropriate time slot. Sampling is necessary because under different battery voltage values, the boost converter's output also changes when it is in an idle state and the switches are configured as in the example of FIG. 1. However, after an initial phase while successive idle and active states follow, the output voltage is higher than VBAT 100 in the case of a boost power converter while working in different output voltage domains. Thus, a soft_start input 312 has an increasing or a decreasing voltage during this sample phase (as illustrated in FIG. 3B).

When a CS1 switch 308 is open during this phase, the most accurate dc voltage at a node of the resistors Ra 304 and Rb 306 can be achieved in a fast way. Thus, the switches in a loop filter block 302, 304, 306 and the sampling are arranged such that a minimum leakage (current) during sampling is achieved. After an idle state, fast response during the soft-start may then be sustained due to node voltages around an EA block 316 being close to the previous active state. EA_OUT node 318 represents an output of the EA 316.

Next, during an actual soft start phase, the CS1 and CS2 switches 308, 310 change their states 320, 322, 324, 326 and thus, the CS1 308 is enabled and the CS2 310 is disabled. At this phase, the EA 316 enters from an idle state into an active state and lets the converter's OUT_BOOST 300 start following an internal soft-start reference voltage from a sampled output voltage and increase or decrease in a controlled manner to a target value. In 330, the sampled voltage 312 is defined by a ratio of Rb/(Ra+Rb) of the output voltage. In 332, in the end of the soft-start period, the Vref (reference voltage) level is reached, and a trigger point to end the soft-start phase is achieved. In 334, in the end of the soft-start period, the output voltage level reached is defined by Vref* (Ra/Rb+1).

Thus, the boost converter is already working in a so called closed loop mode straight from the soft-start phase onwards, which means that it does not need any specific open-loop-like mode during the start-up phase (as those presented in the literature). Therefore, the boost converter is full power capable already before the output voltage has reached the target value, i.e. already before the start-up phase has ended. Thus, a full power activity in around 15 to −20 µs may be achieved without a significant output voltage overshoot, and a charge current limited during the soft-start phase to such an appropriate level that does not cause an erratic operation at the application level.

Eventually, a full power mode may be reached after a triggering point has been bypassed. This methodology is not limited to power converters of boost type only but may also be implemented e.g. with a buck (step-down) type and other types of power converters. In an embodiment, the implementation may be carried out by using a control block of converters by using a selectable compensation network structure.

Figure 4:
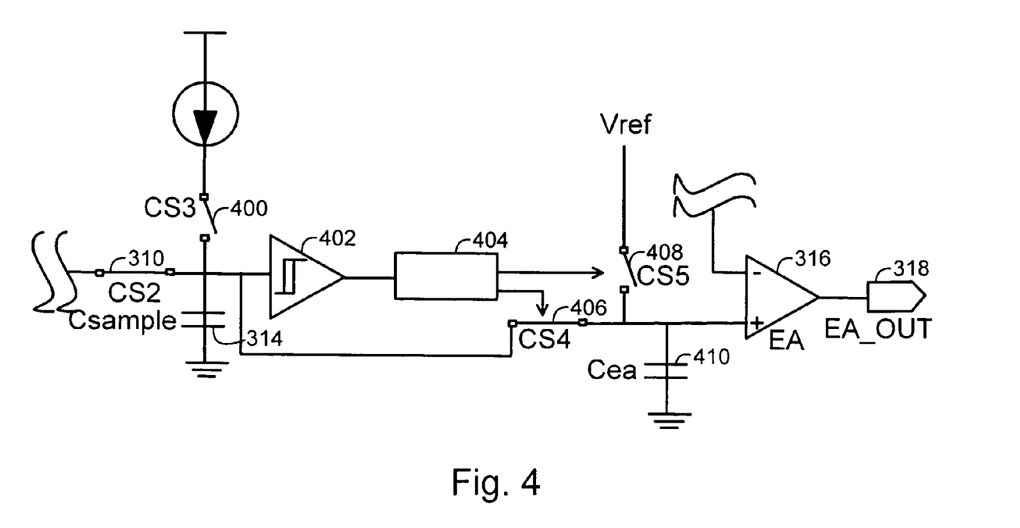
FIG. 4 is a functional example of a soft-start reference block during a sample phase.

FIG. 4 is a functional example of a soft-start reference block during a sample phase. The soft_start reference block 312 and its functionality are described in more detail in the example of FIG. 4. The CS2 switch 310 is again enabled during the sampling phase as is also a CS4 switch 406 in order to keep 'EA_+' 316 following node voltage changes. However, the current source is taken out by a CS3 switch 400. When the soft-start state is enabled, the CS2 switch 310 is in OFF state and the CS3 switch 400 lets the current source to charge the capacitor Csample 314 and a capacitor Cea 410 further on. Now a level trigger 402 still keeps the CS4 switch 406 in ON state until it reaches a level at a full power edge after which a CS5 switch 408 is set to ON state and the CS4 switch 406 is set to OFF state by a switch control block 404.

The control method described above may be controlled by software or be hardware coded (internally or externally). In addition, the implementation may be carried out with a comparator and programmable reference levels. If they are inside a converter, they may be sent directly to the converter or the converter may listen to commands setting it in a controlled manner.

Figure 5:
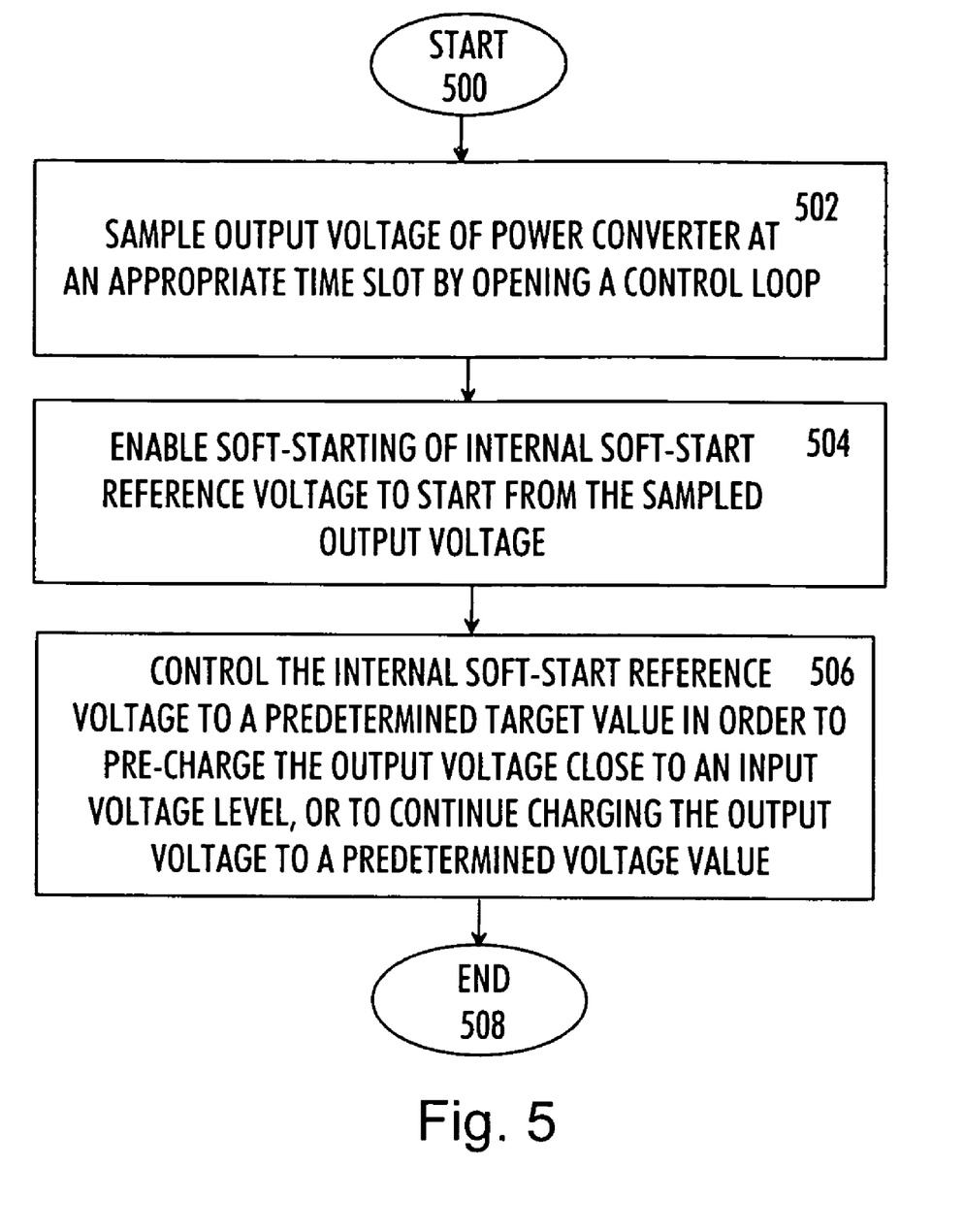
FIG. 5 illustrates a method according to an embodiment.
Figure 6:
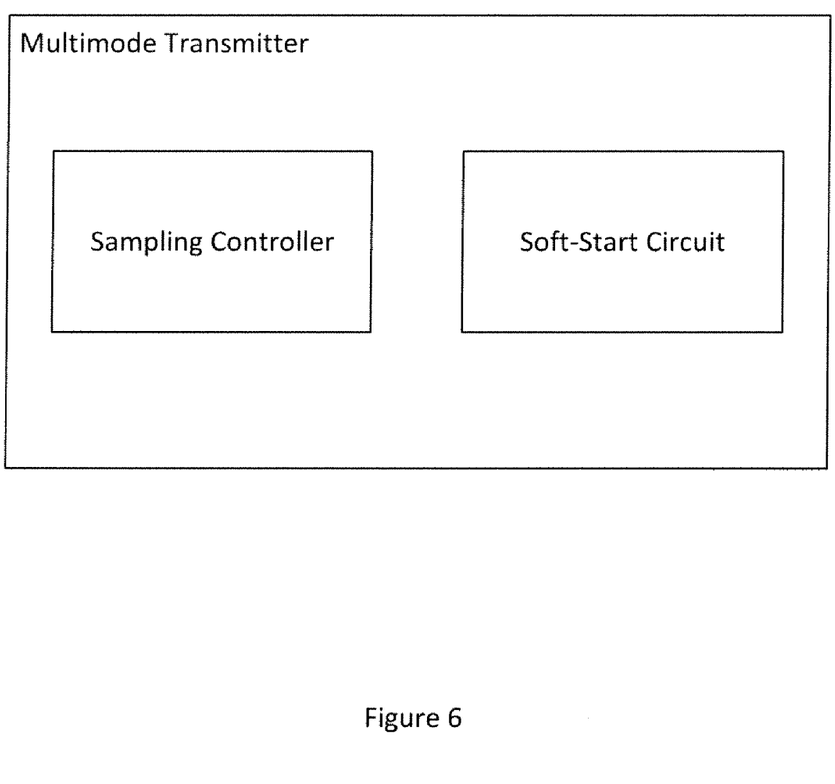
FIG. 6 illustrates a multimode transmitter including a sampling controller and a soft-start circuit, according to certain embodiments.

FIG. 5 illustrates a method according to an embodiment. The method starts in 500. In 502, output voltage of a power converter is sampled at an appropriate time slot by opening a control loop.

In 504, soft-starting of an internal soft-start reference voltage is enabled to start from the sampled output voltage.

In 506, the internal soft-start reference voltage is controlled (increased/decreased) to a predetermined target value in order to pre-charge the output voltage close to an input voltage level, or to continue charging the output voltage to a predetermined output voltage value.

The method ends in 508.

Sampling the output voltage at an appropriate time slot is necessary because under different battery voltage values the boost converter's output changes also in an idle state and the switches are configured as in the example of FIG. 1. However, after an initial phase while successive idle and active states follow, the output voltage is higher than VBAT 100 in the case of a boost power converter while working in different output voltage domains. Thus, the full power activity may be achieved without a significant output voltage overshoot, and charge current may be limited during the soft-start phase to such an appropriate level which does not result in an erratic operation at the application level. In an embodiment, this is enabled by starting the internal soft-start reference voltage from the sampled output voltage and increasing or decreasing the reference voltage in a controlled manner to the target value. Thus, it can be said that an end portion of the internal reference voltage ramp is taken that would otherwise be there if it were started from 0 V level upwards. Now, when starting from the sampled output voltage upwards, the boost converter's output starts to follow a rising reference voltage ramp immediately when being enabled. Thus, the control system of a boost converter may work in a closed loop mode already from the soft-start phase onwards, and thus, no specific open-loop mode is required during the start-up phase. Therefore, the full power capability is reached already before the output voltage has reached the target value, i.e. already before the start-up phase has ended.

No external reference capacitors are necessary when using the embodiments of the invention. Thus, for example with the arrangement of the power switches as illustrated in FIG. 1, the output voltage is naturally pre-charged close to the input voltage level. A fast start-up phase is enabled also in a multimode cellular phone transmitter from the point of view of a powering scheme on the transmission path of the transmitter. When such a wake-up time of an individual block before a transmission slot is limited, a very fast rise time is mandatory, but at the same limiting input current to such an appropriate level which does not cause an erratic operation at the application level. The embodiments of the invention do not require any specific arrangements be used in the control loop block of a power converter since it has a fast transient response, and thus it is possible to follow an internal soft-start reference voltage without special arrangements in the control circuit. Further, a normal mode operating frequency may be used during the soft-start phase.

The embodiments of the invention may be realized in a control circuit comprising: a sampling controller configured to sample an output voltage of a power converter at an appropriate time slot by opening a control loop; and a soft-start circuit configured to enable soft-starting of an internal soft-start reference voltage to start from the sampled output voltage and to control (increase/decrease) the internal soft-start reference voltage to a predetermined target value in order to pre-charge the output voltage close to an input voltage level, or to continue charging the output voltage to a predetermined output voltage value. The control circuit may be configured to perform at least some of the steps described in connection with the flowchart of FIG. 5 and in connection with FIGS. 1 to 4. The control circuit according to an embodiment can be implemented in a multimode mobile terminal, for example. The mobile terminal may comprise a processing unit configured to control the function of the control circuit.

In an embodiment, the output voltage of the power converter is sampled during an off-state or an idle state of a soft-start circuit.

In an embodiment, summing of negative and positive feedback systems is prevented when opening the control loop, and leakages for achieving the most accurate sampling of the output voltage are minimized.

In an embodiment, a selectable compensation network structure for sampling the output voltage may be used. The selectable compensation network structure may be configured to keep node voltages around an error amplifier with a minimum leakage for enabling a fast response time from an idle state to an operational state.

In an embodiment, the internal soft-start reference voltage is increased or decreased in a linear fashion to an externally set reference voltage value.

In an embodiment, it is possible to sustain the control circuit in a closed loop operation mode for achieving a full power capability.

In an embodiment, a normal mode operating frequency is used during the soft-start phase.

The embodiments may be implemented as a computer program comprising instructions for executing a computer process comprising: sampling an output voltage of a power converter at an appropriate time slot by opening a control loop; enabling soft-starting of an internal soft-start reference voltage to start from the sampled output voltage; and controlling the internal soft-start reference voltage to a predetermined target value in order to pre-charge the output voltage close to an input voltage level, or to continue charging the output voltage to a predetermined output voltage value.

The computer program may be stored on a computer program distribution medium readable by a computer or a processor. The computer pro-gram medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

It will be obvious to a person skilled in the art that as technology advances, the inventive concept can be implemented in various ways. The invention and its embodiments are not limited to the examples described above but may vary within the scope of the claims.

The invention claimed is:

1. An apparatus, comprising:
an error amplifier, a first switch and a second switch, wherein the first switch is coupled to a first input of the error amplifier and the second switch is coupled to a first sampling element;
a sampling controller configured to sample an output voltage of a power converter during a sampling phase at an appropriate time slot by opening a control loop, wherein the sampling is enabled by closing the second switch and the control loop is opened by opening the first switch, thereby causing the sampling phase to take place during an open-loop configuration; and
a soft-start circuit configured to enable soft-starting of an internal soft-start reference voltage to start from a sampled non-zero output voltage and to control the internal soft-start reference voltage to a predetermined target value in order to pre-charge the output voltage close to an input voltage level, or to continue charging the output voltage to a predetermined output voltage value, wherein the non-zero output voltage is the start voltage for the soft start reference voltage and the soft-starting takes place during a soft-start phase which is triggered by closing the first switch and opening the second switch, thereby causing the soft-start phase to take place during a closed-loop configuration.

2. The apparatus of claim 1, wherein the soft-start circuit is configured to control the internal soft-start reference voltage to a predetermined target value by increasing or decreasing the internal soft-start reference voltage.

3. The apparatus of claim 1, wherein the sampling controller is configured to sample the output voltage of the power converter during an off-state or an idle state of the soft-start circuit.

4. The apparatus of claim 1, wherein the sampling controller is further configured to prevent summing of negative and positive feedback systems when opening the control loop, and configured to minimize current leakages for achieving the most accurate sampling of the output voltage.

5. The apparatus of claim 1, further comprising:
a selectable compensation network structure configured to sample the output voltage and to keep at least one node voltage at an input of an error amplifier with a minimum current leakage close to a previous active state of the soft-start circuit to enable a fast response time from an idle state to an operational state of the soft-start circuit.

6. The apparatus of claim 1, wherein the soft-start circuit is further configured to increase or decrease the internal soft-start reference voltage in a linear fashion to an externally set reference voltage value.

7. The apparatus of claim 1, wherein the soft-start circuit is further configured to enable sustenance of a control circuit in a closed loop operation mode for achieving a full power capability.

8. The apparatus of claim 1, wherein the soft-start circuit is further configured to use a normal mode operating frequency during the soft-start phase.

9. A method, comprising:
sampling an output voltage of a power converter during a sampling phase at an appropriate time slot by opening a control loop, wherein the sampling is enabled by closing a second switch coupled to a first sampling element and the control loop is opened by opening a first switch coupled to a first input of an error amplifier, thereby causing the sampling phase to take place during an open-loop configuration;
enabling soft-starting of an internal soft-start reference voltage to start from a sampled non-zero output voltage; and
controlling the internal soft-start reference voltage to a predetermined target value in order to pre-charge the output voltage close to an input voltage level, or to continue charging the output voltage to a predetermined output voltage value, wherein the non-zero output voltage is the start voltage for the soft start reference voltage and the soft-starting takes place during a soft-start phase which is triggered by closing the first switch and opening the second switch, thereby causing the soft-start phase to take place during a closed-loop configuration.

10. The method of claim 9, further comprising:
controlling the internal soft-start reference voltage to a predetermined target value by increasing or decreasing the internal soft-start reference voltage.

11. The method of claim 9, further comprising:
sampling the output voltage of the power converter during an off-state or an idle state of a soft-start circuit.

12. The method of claim 9, further comprising:
preventing summing of negative and positive feedback systems when opening the control loop, and minimizing current leakages for achieving the most accurate sampling of the output voltage.

13. The method of claim 9, further comprising:
using a selectable compensation network structure for sampling the output voltage, wherein the selectable compensation network structure is configured to keep at least one node voltage at an input of an error amplifier with a minimum current leakage close to a previous active state of a soft-start circuit to enable a fast response time from an idle state to an operational state of the soft-start circuit.

14. The method of claim 9, further comprising:
increasing or decreasing the internal soft-start reference voltage in a linear fashion to an externally set reference voltage value.

15. The method of claim 9, further comprising:
enabling sustenance of a control circuit in a closed loop operation mode for achieving a full power capability.

16. The method of claim 9, further comprising:
using a normal mode operating frequency during the soft-start phase.

17. A multimode transmitter, comprising:
an error amplifier, a first switch and a second switch, wherein the first switch is coupled to a first input of the error amplifier and the second switch is coupled to a first sampling element;
a sampling controller configured to sample an output voltage of a power converter during a sampling phase at an appropriate time slot by opening a control loop, wherein the sampling is enabled by closing the second switch and the control loop is opened by opening the first switch, thereby causing the sampling phase to take place during an open-loop configuration; and
a soft-start circuit configured to enable soft-starting of an internal soft-start reference voltage to start from a sampled non-zero output voltage and to control the internal soft-start reference voltage to a predetermined target value in order to pre-charge the output voltage close to an input voltage level, or to continue charging the output voltage to a predetermined output voltage value, wherein the non-zero output voltage is the start voltage for the soft start reference voltage and the soft-starting takes place during a soft-start phase which is triggered by closing the first switch and opening the second switch, thereby causing the soft-start phase to take place during a closed-loop configuration.

18. A computer program embodied on a non-transitory computer readable medium, the computer program being configured to control a processor to perform:
sampling an output voltage of a power converter during a sampling phase at an appropriate time slot by opening a control loop, wherein the sampling is enabled by closing a second switch coupled to a first sampling element and the control loop is opened by opening a first switch coupled to a first input of an error amplifier, thereby causing the sampling phase to take place during an open-loop configuration;
enabling soft-starting of an internal soft-start reference voltage to start from a sampled non-zero output voltage; and
controlling the internal soft-start reference voltage to a predetermined target value in order to pre-charge the output voltage close to an input voltage level, or to continue charging the output voltage to a predetermined output voltage value, wherein the non-zero output voltage is the start voltage for the soft start reference voltage and the soft-starting takes place during a soft-start phase which is triggered by closing the first switch and opening the second switch, thereby causing the soft-start phase to take place during a closed-loop configuration.

19. The computer program of claim 18, the method further comprising:
sampling the output voltage of the power converter during an off-state or an idle state of a soft-start circuit.

20. The computer program of claim 18, the method further comprising:
preventing summing of negative and positive feedback systems when opening the control loop, and minimizing current leakages for achieving the most accurate sampling of the output voltage.

21. The computer program of claim 18, wherein the non-transitory computer readable medium includes at least one of the following media:
a program storage medium, a record medium, a computer readable memory, a computer readable software distribution package, a computer readable signal, a computer readable telecommunications signal, or a computer readable compressed software package.

22. An apparatus, comprising:
an error amplifier, a first switch and a second switch, wherein the first switch is coupled to a first input of the error amplifier and the second switch is coupled to a first sampling element;
sampling means for sampling an output voltage of a power converter during a sampling phase at an appropriate time slot by opening a control loop, wherein the sampling is enabled by closing the second switch and the control loop is opened by opening the first switch, thereby causing the sampling phase to take place during an open-loop configuration; and
enabling means for enabling soft-starting of an internal soft-start reference voltage to start from a sampled non-zero output voltage and means for controlling the internal soft-start reference voltage to a predetermined target value in order to pre-charge the output voltage close to an input voltage level, or to continue charging the output voltage to a predetermined output voltage value, wherein the non-zero output voltage is the start voltage for the soft start reference voltage and the soft-starting takes place during a soft-start phase which is triggered by closing the first switch and opening the second switch, thereby causing the soft-start phase to take place during a closed-loop configuration.

23. The apparatus of claim 22, further comprising:
sampling means for sampling the output voltage of the power converter during an off-state or an idle state of the soft-start circuit.

24. The apparatus of claim 22, further comprising:
preventing means for preventing summing of negative and positive feedback systems when opening the control loop, and minimizing current leakages for achieving the most accurate sampling of the output voltage.

25. The apparatus of claim 1, further comprising:
a current source configured charge the first sampling element and a second sampling element during the soft-start phase, wherein the charging is enabled by opening a third switch coupled to the first sampling element and to the second sampling element and wherein the second sampling element is coupled to a second input of the error amplifier.

26. The apparatus of claim 1, further comprising:
at least two impedance elements configured to perform voltage division wherein the sampling is performed after the voltage division.

27. The method of claim 9, further comprising:
charging, by a current source, the first sampling element and the second sampling element during the soft-start phase, wherein the charging is enabled by opening a third switch coupled to the first sampling element and to the second sampling element and wherein the second sampling element is coupled to a second input of the error amplifier.

28. The method of claim 9, further comprising:
performing the sampling after a voltage division, wherein the voltage division is performed by at least two impedance elements.

* * * * *